United States Patent Office 3,517,276
Patented June 23, 1970

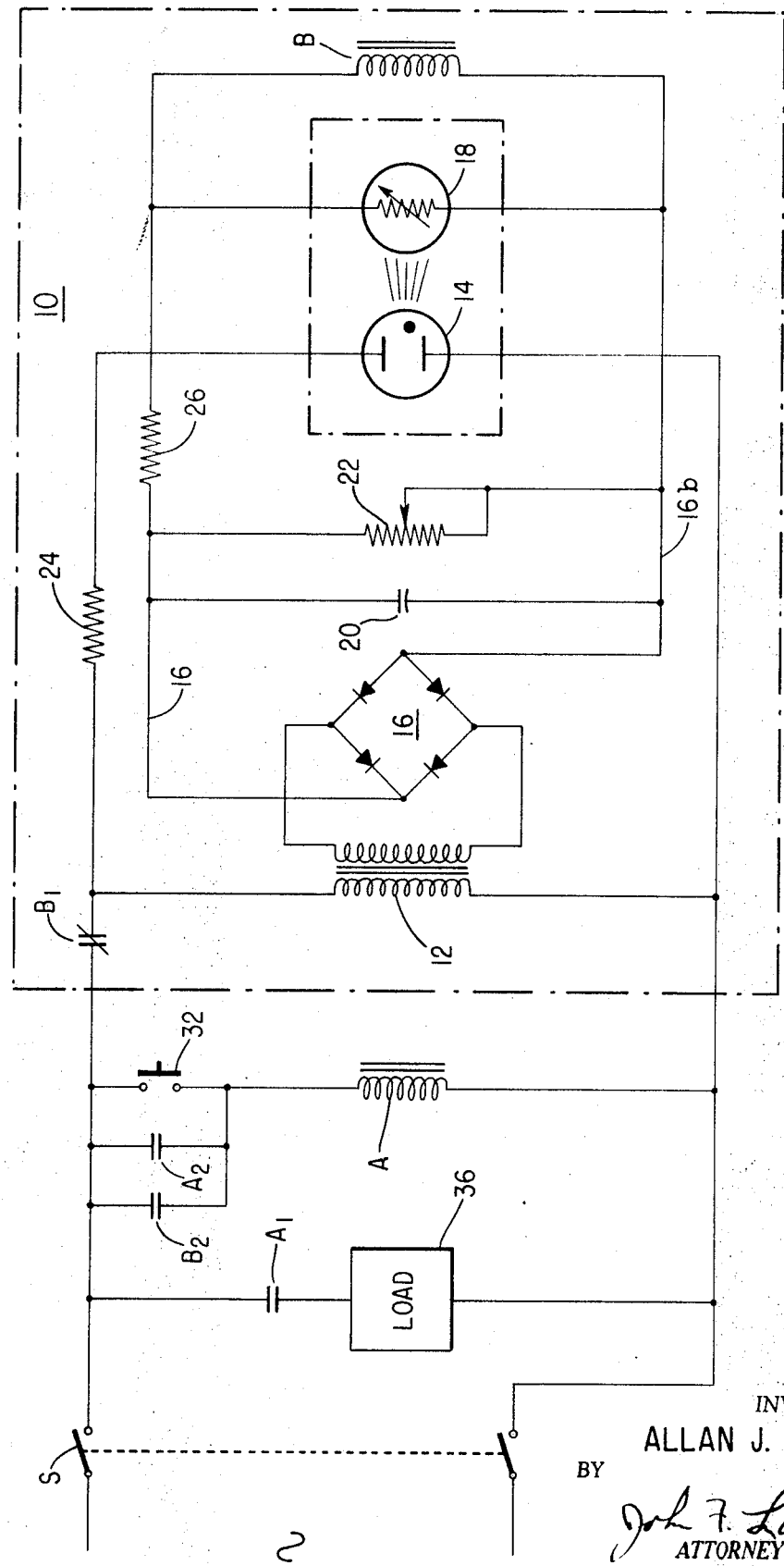

3,517,276
PHOTOELECTRIC TIME DELAY
SWITCH CIRCUIT
Allan J. Zadiraka, Barberton, Ohio, assignor to The
Babcock & Wilcox Company, New York, N.Y., a
corporation of New Jersey
Filed Oct. 19, 1967, Ser. No. 676,538
Int. Cl. H01h 47/24
U.S. Cl. 317—124
7 Claims

ABSTRACT OF THE DISCLOSURE

A photoelectric switch circuit comprising a light-sensitive cell of varying resistance in parallel with a relay coil. A light source directed at the cell controls the resistive value of the cell such that, in the presence of light, the cell acts as an electrical shunt across the relay coil and, in the absence of light, the cell acts as an open circuit. A charged capacitor is connected in parallel with the cell and relay coil and is permitted to discharge through the relay coil when the light source is extinguished; the relay being energized for a period of time by the capacitor discharge.

BACKGROUND OF THE INVENTION

Field of the invention

This invention relates to an electric switch and more particularly to a light-activated electric switch.

Description of the prior art

In electrical control systems subject to momentary power interruptions, there exists a requirement for a secondary circuit which will either enable the control system to return to normal operation after the interruption or will provide a redundant power source which will maintain the control system in an active state during the power interruption. The latter method generally results in a complex, expensive circuit often including an inverter. In addition to the limited reliability of such a circuit, the cost of the circuit makes its application to many control systems prohibitive.

SUMMARY OF THE INVENTION

The photoelectric circuit which is the subject of my invention provides a reliable, inexpensive circuit which, when applied to a control system, will provide means to override momentary power interruptions as well as providing contacts to bypass safety circuits, activate alarm circuits, etc.

A lamp of a photocell-lamp assembly is energized by the power circuit which activates the control system. The photocell, consisting of a light-sensitive resistive element, acts as a shunt across a relay coil. A D.C. supply charges a capacitor in parallel with the photocell and relay coil, the capacitor discharging through the relay coil when the resistance of the photocell is caused to greatly exceed that of the relay coil as a result of a power failure to the lamp. The discharge through the relay coil causes the relay to be energized for a period of time following a power failure during which the contacts of said relay are available to maintain the control system in a state whereby restoration of the power will re-activate the control system.

BRIEF DESCRIPTION OF THE DRAWING

The drawing illustrates schematically a circuit embodying the invention.

DESCRIPTION OF THE PREFERRED EMBODIMENT

Referring to circuit 10 of the drawing, there is shown schematically a neon lamp 14 energized by alternating line voltage and directing light rays to a light sensitive cadmium sulfide photocell 18. The alternating voltage supplying said neon lamp is reduced in magnitude by transformer 12 and subsequently applied to full wave rectifier circuit 16 which converts the alternating output voltage of transformer 12 to a proportional direct voltage output. A variable time delay circuit consisting of the parallel combination of capacitor 20 and variable resistor 22 is connected across the direct voltage output leads 16a and 16b; said capacitor 20 acquiring a voltage charge equal to the D.C. output of rectifier circuit 16. The D.C. output of rectifier circuit 16, appearing across leads 16a and 16b, is, likewise, applied to the parallel combination of photocell 18 and relay coil B. Resistors 24 and 26 function as current limiting resistors in their respective alternating and direct voltage circuits. Furthermore, resistor 24 determines the excitation voltage applied to neon lamp 14. The electrical characteristics of photocell 18 are such that, in the presence of light from neon lamp 14, the resistance of cell 18 is much less than that exhibited by relay coil B, and cell 18 will act as an electrical shunt across relay coil B, thereby preventing energization of coil B. However, in the absence of light from lamp 14, resulting from an interruption of voltage to transformer 12 and neon lamp 14, the electrical resistance of cell 18 greatly exceeds the electrical resistance of relay coil B thus permitting capacitor 20 to discharge through the parallel resistance path established by variable resistor 22 and resistor 26 in series with relay coil B. The capacitor discharge will energize said relay coil B and maintain said energized condition until the capacitor voltage decreases below a prescribed level. The time duration within which relay coil B is energized can be changed by adjusting variable resistor 22, for it is well known that the more resistance in a resistance-capacitance circuit, the longer the time required to fully discharge a charged capacitor.

The drawing schematically illustrates a typical embodiment of circuit 10 whereby said circuit functions to override a power interruption of short duration as would, for example, be experienced during a bus transfer. Power applied to circuit 10 through switch S and normally closed contacts $B_1$, is, likewise, applied to a load control circuit comprised of momentary switch contacts 32, and relay coil A. The momentary closing of switch contacts 32, indicative, for example, of a remote start signal, will energize relay coil A. The energization of relay coil A will cause normally open contacts $A_1$ and $A_2$ to close permitting load circuit 36 to be activated through contacts $A_1$, while contacts $A_2$ act as seal-in contacts across momentary switch contacts 32. In addition to contacts $A_2$ shunting switch contacts 32, normally open contacts $B_2$ of relay B are connected in parallel with contacts $A_2$ and, likewise, shunt switch contacts 32.

In the event of an interruption of power to the load control circuit and circuit 10, relay coil A will be de-energized thereby de-activating load circuit 36. Furthermore, the interruption of power to circuit 10 will remove excitation voltage from transformer 12 and neon lamp 14 thereby permitting relay coil B to be energized by capacitor 20. The immediate energization of relay B will cause contacts $B_2$ to close thereby providing an electrical path which will enable relay A to be energized if power is restored within the period of time relay B remains energized. Assuming the power interruption to be momentary, as in a bus transfer, and the power is restored within the energization period established for relay B, relay A will be energized through contacts B₂ resulting in the closure of contacts A₁ and A₂.

Normally closed contacts B₁ are placed in an open condition by energization of relay B and function to prevent timer circuit 10 from resetting before relay A has been energized by the restoration of power. The restoration of power will subsequently energize lamp 14 thereby de-energizing relay B by means of the shunting action of photocell 18. Restoration of power after an interruption, the duration of which exceeds the energization period of relay B, will not automatically energize relay A, but will, instead, require a start signal as represented by a closing of switch contacts 32.

It will be apparent that the embodiment shown is by way of example only and that various modifications can be made in construction and arrangement within the scope of the invention as defined in the appended claims.

What I claim as new and desire to secure by Letters Patent of the United States is:

1. A photoelectric time delay switch circuit comprising:
   a direct voltage source energized by alternating line voltage;
   a variable time delay circuit including a capacitor and a variable resistor in parallel; said time delay circuit connected to said direct voltage source;
   a light sensitive resistance cell connected in parallel with said time delay circuit; said resistance cell exhibiting low resistance in the presence of light and high resistance in the absence of light;
   a electric relay having at least one set of normally open contacts; said relay connected in parallel with said light sensitive cell for activation by said direct voltage source;
   a light source energized by said alternating voltage source and directing light to the light sensitive cell;
   whereby the presence of light from said light source will cause the light sensitive cell to function as an electric shunt across said electric relay thereby preventing activation of said relay by said direct voltage source, whereas an interruption of said alternating voltage will extinguish said light source thereby removing the shunt from said relay permitting said relay to be activated for a predetermined period of time by the voltage charge on said time delay capacitor.

2. Apparatus for preventing a momentary failure in a source of power from causing permanent loss of power to a load while permitting longer power failures to cause permanent loss of power to a load comprising, an electro-magnet having an energizing coil connected in series with a first normally open switch across said power source, hold-in contacts operated by and upon energization of said electro-magnet by momentary closure of said first switch to shunt said switch and contacts operated by and upon energization of said electro-magnet to connect said load to the power source, a second normally open switch connected in parallel across said hold-in contacts and means closing said last named switch upon failure of the source of power for the duration of a momentary loss of power so that said load is energized upon restoration of power without closure of said first switch.

3. Apparatus as set forth in claim 2 wherein said last named means includes an electro-magnet which upon energization closes said last named switch and means energizing said electro-magnet upon failure of the power source for a period of time at least equal to the duration of a momentary power failure.

4. Apparatus as set forth in claim 3 wherein said last named means includes a light sensitive cell and a light source illuminating said cell energized from the power source whereby said electro-magnet is normally de-energized and means operative upon a failure of said power source for momentarily energizing said electro-magnet.

5. Apparatus as set forth in claim 4 wherein said electro-magnet and light sensitive cell are connected in parallel in a circuit energized from the power source and said last named means is a capacitor connected in parallel with said electro-magnet and said light sensitive cell.

6. Apparatus as set forth in claim 5 including means for adjusting the rate of discharge of said capacitor.

7. Apparatus as set forth in claim 6 wherein said last named means is a potentiometer connected in said circuit in parallel with said capacitor.

References Cited

UNITED STATES PATENTS 3,242,383   3/1966   Opad _____ 317—124 X

LEE T. HIX, Primary Examiner

W. J. SMITH, Assistant Examiner

U.S. Cl. X.R.

307—130; 317—141